No. 827,619. PATENTED JULY 31, 1906.
W. W. COX.
PROPELLING MECHANISM FOR VESSELS.
APPLICATION FILED AUG. 1, 1905.

Witnesses:
Phil. O. Barnes
C. C. Hines

Inventor
W. W. Cox.
By Victor J. Evans
Attorney

UNITED STATES PATENT OFFICE.

WALLACE W. COX, OF PUNGO, VIRGINIA.

PROPELLING MECHANISM FOR VESSELS.

No. 827,619.              Specification of Letters Patent.              Patented July 31, 1906.

Application filed August 1, 1905. Serial No. 272,232.

*To all whom it may concern:*

Be it known that I, WALLACE W. COX, a citizen of the United States, residing at Pungo, in the county of Princess Anne and State of Virginia, have invented new and useful Improvements in Propelling Mechanism for Vessels, of which the following is a specification.

This invention relates to propelling mechanism for vessels, and has for its object to provide a simple and effective motor-driven propelling mechanism of the side-wheel type for launches and other small vessels, the same embodying friction-gearing readily controllable to stop the vessel and propel it forward and backward at will.

Figure 1:
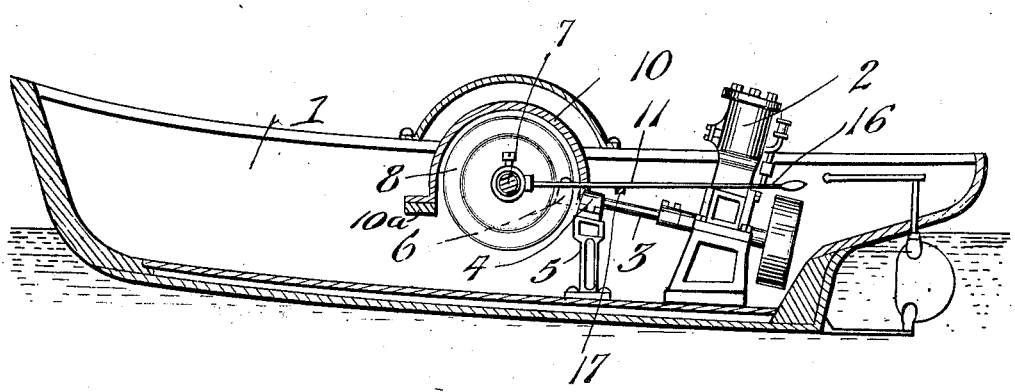
Figure 2:
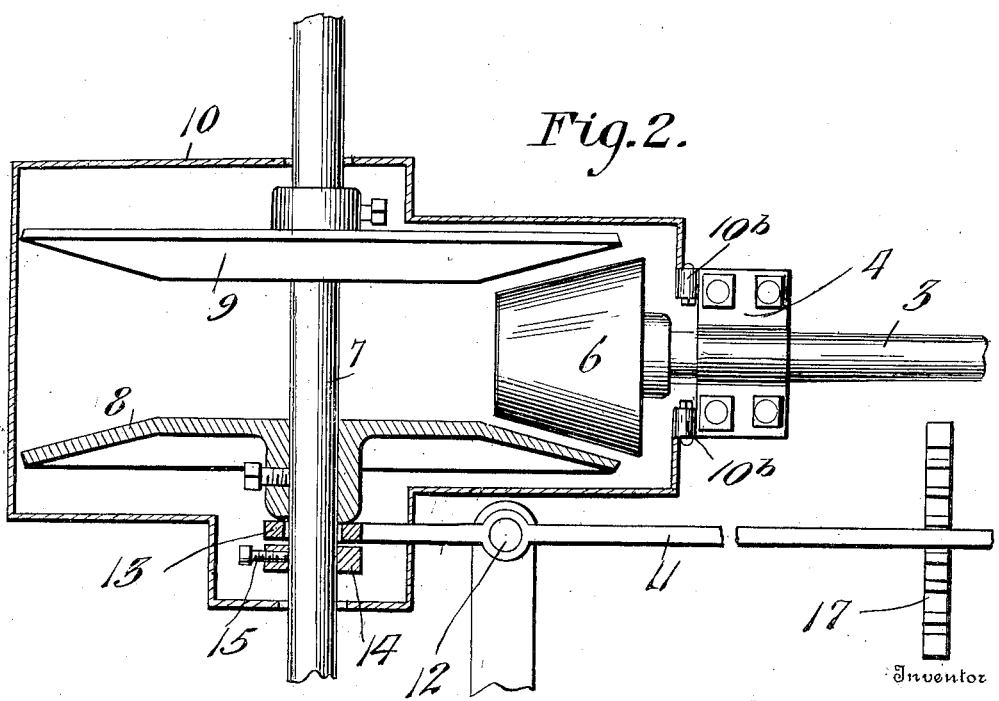

In the accompanying drawings, Figure 1 is a longitudinal section of a launch equipped with my invention; and Fig. 2 is a top plan view, on an enlarged scale, of the reversible friction-gearing.

1 in the drawings denotes the hull of the vessel, in which is arranged a gasolene or other engine or motor 2. The shaft 3 of the motor projects forwardly and is journaled at its forward end in a bearing 4, carried by a bed-block 5, and fixed upon said forward end of the shaft is a friction driving-cone 6. The gear 6 is disposed in rear of the transverse propeller-shaft 7 and between two friction-gears 8 and 9, fixed to said shaft. The propeller-shaft extends through the side walls of a suitable hood or housing 10, covering the gearing, and is suitably journaled to rotate and slide longitudinally to a limited extent in the side walls of the hull. A propeller-wheel of any preferred construction will be mounted in practice on each projecting end of the propeller-shaft.

The head or housing 10 is substantially of semicircular form in longitudinal and cross section and rests or is secured at its forward edge to a cross-piece 10ª, suitably fixed to the vessel, and has its rear end or edge bifurcated for the passage of the forward end of the shaft 3 and the parts of the bifurcated portion suitably fastened, as by bolting connections 10ᵇ, to the bearing 4, thus adapting said bearing to serve a double function.

A shifting-lever 11, intermediately pivoted at 12, is provided to shift the shaft 7 to bring either gear 8 of 9 into contact with the drive-gear 6. The forward end of said lever is formed with an eye 13, encompassing the shaft 7 between the hub of the gear 8 and a collar 14, adjustably fastened to the shaft by a set-screw 15. By means of this lever the shaft 7 may be shifted longitudinally to move either friction-gear 8 or 9 into contact with gear 6 to drive the vessel forward or backward or to adjust both gears to a neutral position, as shown in Fig. 2, to stop the motion of the propellers. The handle end 16 of the lever is adapted to be engaged with a rack 17 to lock it in any of its adjusted positions and may be so arranged with relation to the other parts of the controlling equipment that a single operator may control the engine, rudder, and drive-gearing.

The invention provides a simple, convenient, and economical drive-gearing for launches and other small vessels and will be found of especial advantage in use upon launches and like vessels plying waters where an abundance of long tough grass renders a screw-propeller almost useless.

Having thus fully described my invention, what I claim as new, and desire to secure by Letters Patent, is—

In a reversible propelling mechanism for vessels, the combination of a propeller-shaft extending transversely of the vessel and journaled to rotate in bearings in the side walls thereof, said shaft also being adapted to slide longitudinally in said bearings, friction-gears fixed to said shaft, a bearing disposed in rear of and on a line between and adjacent to said gears, a stern-motor having its shaft projecting forwardly and journaled in said bearing, a friction drive-gear upon the forward end of said shaft and arranged between the friction-gears on the propeller-shaft, a collar adjustably mounted on the propeller-shaft adjacent one of the friction-gears thereon, a laterally-swinging intermediately-pivoted lever extending longitudinally of the vessel and having its rear end arranged adjacent the motor and its forward end formed with an eye embracing the propeller-shaft between said collar and friction-gear contiguous thereto, whereby reverse lateral movements of said lever will shift the propeller-shaft longitudinally to move either friction-gear thereon into and out of engagement with the friction drive-gear, and a semicircular hood covering the gears and contiguous portions of the shafts, said hood being suitably supported at its forward edge and fastened at its rear edge to the bearing in which the forward end of the motor-shaft is journaled, substantially as described.

In testimony whereof I affix my signature in presence of two witnesses.

WALLACE W. COX.

Witnesses:
E. M. BAUM,
JAS. E. DAWLEY.